US012647664B2

(12) United States Patent
Wang

(10) Patent No.: US 12,647,664 B2
(45) Date of Patent: Jun. 2, 2026

(54) CAMERA MODULE, IMAGING METHOD, AND ELECTRONIC DEVICE

(71) Applicant: VIVO MOBILE COMMUNICATION CO., LTD., Dongguan (CN)

(72) Inventor: Danmei Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 440 days.

(21) Appl. No.: 18/203,051

(22) Filed: May 29, 2023

(65) Prior Publication Data

US 2023/0300440 A1 Sep. 21, 2023

Related U.S. Application Data

(63) Continuation of application No. PCT/CN2021/132367, filed on Nov. 23, 2021.

(30) Foreign Application Priority Data

Nov. 30, 2020 (CN) .......................... 202011378465.2

(51) Int. Cl.
*H04N 23/55* (2023.01)
*H04N 23/51* (2023.01)
*H04N 23/57* (2023.01)

(52) U.S. Cl.
CPC ............. *H04N 23/55* (2023.01); *H04N 23/51* (2023.01); *H04N 23/57* (2023.01)

(58) Field of Classification Search
CPC ........ H04N 23/55; H04N 23/51; H04N 23/57; H04N 25/134; H04N 23/54; H04N 25/48; H04N 23/84
See application file for complete search history.

(56) References Cited

U.S. PATENT DOCUMENTS 8,836,096 B2 9/2014 Kosaka et al.
10,775,614 B1 * 9/2020 Gross ..................... H04N 23/55
(Continued)

FOREIGN PATENT DOCUMENTS

CN 106210678 A 12/2016
CN 109343293 A 2/2019
(Continued)

OTHER PUBLICATIONS

Notice of Reason of Refusal issued in related Japanese Application No. 2023-530584, mailed Oct. 1, 2024, 10 pages.
(Continued)

*Primary Examiner* — Mekonnen D Dagnew
(74) *Attorney, Agent, or Firm* — IPX PLLC

(57) ABSTRACT

A camera module, an imaging method, and an electronic device are provided. The camera module includes: a lens, a lens fixing assembly, a circuit board, an image sensor, and a driving assembly. The fixing assembly is provided with a mounting groove, and the lens is mounted in the mounting groove. The lens, the lens fixing assembly, and the circuit board are enclosed to form an accommodating cavity, the image sensor is arranged in the accommodating cavity and is arranged opposite to the lens, and the image sensor is electrically connected to the circuit board. The driving assembly is located between the image sensor and the circuit board, and the driving assembly is configured to drive the image sensor to move along a first straight line and a second straight line on a plane perpendicular to an optical axis of the lens.

14 Claims, 8 Drawing Sheets

(56) References Cited

U.S. PATENT DOCUMENTS

| | | | | |
|---|---|---|---|---|
| 2007/0002159 A1* | 1/2007 | Olsen | ................... | H04N 23/16 |
| | | | | 348/335 |
| 2008/0017942 A1* | 1/2008 | Kosaka | ............... | H04N 23/685 |
| | | | | 257/E31.127 |
| 2014/0313355 A1 | 10/2014 | Park et al. | | |
| 2017/0017056 A1 | 1/2017 | Park et al. | | |
| 2017/0040909 A1* | 2/2017 | Liu | ....................... | H02N 1/008 |
| 2018/0072561 A1 | 3/2018 | Liu et al. | | |

FOREIGN PATENT DOCUMENTS

| | | | |
|---|---|---|---|
| CN | 109348104 A | 2/2019 |
| CN | 109639997 A | 4/2019 |
| CN | 110661950 A | 1/2020 |
| CN | 111153378 A | 5/2020 |
| CN | 111556239 A | 8/2020 |
| CN | 111654603 A | 9/2020 |
| CN | 112492165 A | 3/2021 |
| JP | 2008203402 A | 9/2008 |
| JP | 2014052438 A | 3/2014 |
| JP | 2019106183 A | 6/2019 |
| JP | 2020106845 A | 7/2020 |
| WO | 2008075596 A1 | 6/2008 |
| WO | 2014084022 A1 | 6/2014 |

OTHER PUBLICATIONS

Extended European Search Report issued in related European Application No. 21896961.6, mailed Mar. 7, 2024, 10 pages.

Notice of Reason of Refusal issued in related Japanese Application No. 2023-530584, mailed Jun. 4, 2024, 9 pages.

International Search Report issued in corresponding International Application No. PCT/CN2021/132367, mailed Mar. 2, 2022, 4 pages.

First Office Action issued in related Chinese Application No. 202011378465.2, mailed Sep. 29, 2021, 9 pages.

* cited by examiner

Obtain a first frame of image by using the camera module, and drive, through the driving assembly, an image sensor to move by a first preset distance in a first direction along a first straight line on a plane perpendicular to an optical axis of the lens, move by a second preset distance in a second direction along a second straight line on the plane perpendicular to the optical axis of the lens,and move by a third preset distance in a third direction along the first straight line on the plane perpendicular to the optical axis of the lens in sequence, to obtain a second frame of image, a third frame of image, and a fourth frame of image correspondingly, where the third direction is a direction opposite to the first direction

71

Generate a final image according to the first frame of image, the second frame of image, the third frame of image, and the fourth frame of image

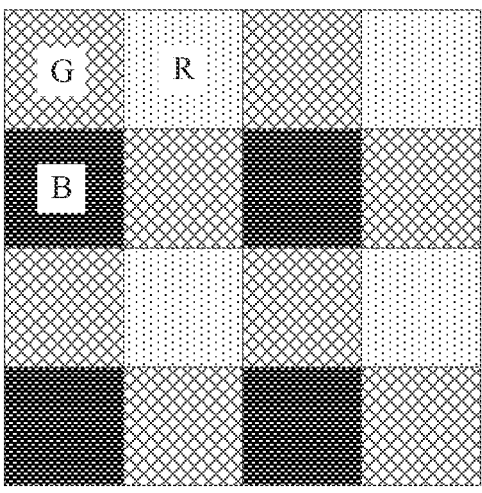

CAMERA MODULE, IMAGING METHOD, AND ELECTRONIC DEVICE

CROSS-REFERENCE TO RELATED APPLICATIONS

This application is a continuation of International Application No. PCT/CN2021/132367, filed on Nov. 23, 2021, which claims priority to Chinese Patent Application No. 202011378465.2, filed on Nov. 30, 2020. The entire contents of each of the above-identified applications are expressly incorporated herein by reference.

TECHNICAL FIELD

This application relates to the field of communication technologies, and specifically, to a camera module, an imaging method, and an electronic device.

BACKGROUND

At present, main solutions to improving the photographing effect of mobile terminal products are: 1, improving the photosensitivity by using large pixels; and 2, performing image processing through a platform-side algorithm (for example: multi-frame fusion). However, both of the above two solutions have defects. For solution 1, under the same physical size, increasing a pixel unit size leads to a decrease in resolution, while increasing the physical size leads to an increase in cost; and for solution 2, the image processing performed through the platform-side algorithm increases image processing power consumption and increases the image output time.

SUMMARY

A camera module, an imaging method, and an electronic device are provided.

According to a first aspect, an embodiment of this application provides a camera module, and the camera module includes:

a lens, a lens fixing assembly, a circuit board, an image sensor, and a driving assembly, where the lens fixing assembly is arranged at one side of the circuit board, the lens fixing assembly is provided with a mounting groove, and the lens is mounted in the mounting groove;

the lens, the lens fixing assembly, and the circuit board are enclosed to form an accommodating cavity, the image sensor is arranged in the accommodating cavity and is arranged opposite to the lens, and the image sensor is electrically connected to the circuit board; and the driving assembly is located between the image sensor and the circuit board, and the driving assembly is configured to drive the image sensor to move along a first straight line and a second straight line on a plane perpendicular to an optical axis of the lens, where the first straight line and the second straight line are perpendicular to each other.

In some implementations, the driving assembly includes at least one first electrostatic comb-drive actuator and at least one second electrostatic comb-drive actuator, the first electrostatic comb-drive actuator is configured to drive the image sensor to move along the first straight line on the plane perpendicular to the optical axis of the lens, and the second electrostatic comb-drive actuator is configured to drive the image sensor to move along the second straight line on the plane perpendicular to the optical axis of the lens.

In some implementations, the first electrostatic comb-drive actuator includes first movable tooth portion and first fixed tooth portion, the second electrostatic comb-drive actuator comprises a second movable tooth portion and a second fixed tooth portion, the first fixed tooth portion and the second fixed tooth portion are connected to the circuit board, the first movable tooth portion and the second movable tooth portion are connected to the image sensor, in a case that a drive voltage is applied to the first electrostatic comb-drive actuator, the first movable tooth portion is movable along the first straight line, and in a case that the drive voltage is applied to the second electrostatic comb-drive actuator, the second movable tooth portion is movable along the second straight line.

In some implementations, two first electrostatic comb-drive actuators and two second electrostatic comb-drive actuators are provided, the two first electrostatic comb-drive actuators and the two second electrostatic comb-drive actuators are arranged in a rectangular grid, and orthographic projections of the two first electrostatic comb-drive actuators on the circuit board are centrally symmetrical, and orthographic projections of the two second electrostatic comb-drive actuators on the circuit board are centrally symmetrical.

In some implementations, the driving assembly further includes a driver chip, the driver chip is arranged on the circuit board, the driver chip is connected to the first electrostatic comb-drive actuator and the second electrostatic comb-drive actuator, and the driver chip is configured to drive the first electrostatic comb-drive actuator and the second electrostatic comb-drive actuator to work.

In some implementations, the lens fixing assembly includes a base and a driving motor, the base is fixed on one side of the circuit board, the driving motor is arranged on the base, the lens is connected to the driving motor, and the driving motor is configured to drive the lens to move on the optical axis of the lens.

In some implementations, a filter is arranged between the lens and the image sensor, and the filter is perpendicular to the optical axis of the lens.

According to a second aspect, an embodiment of this application provides an imaging method, applied to the camera module according to the first aspect, and the imaging method includes:

obtaining a first frame of image by using the camera module, and driving, through the driving assembly, an image sensor to move by a first preset distance in a first direction along a first straight line on a plane perpendicular to an optical axis of the lens, move by a second preset distance in a second direction along a second straight line on the plane perpendicular to the optical axis of the lens, and move by a third preset distance in a third direction along the first straight line on the plane perpendicular to the optical axis of the lens in sequence, to obtain a second frame of image, a third frame of image, and a fourth frame of image correspondingly, where the third direction is a direction opposite to the first direction; and generating a final image according to the first frame of image, the second frame of image, the third frame of image, and the fourth frame of image.

In some implementations, the first frame of image includes several square pixel units, and the first preset distance, the second preset distance, and the third preset distance are all positive integer multiples of a side length of a single pixel unit.

In some implementations, the step of generating a final image according to the first frame of image, the second frame of image, the third frame of image, and the fourth frame of image includes:

obtaining single-channel data of each color in the first frame of image, the second frame of image, the third frame of image, and the fourth frame of image;

rearranging single-channel data of the same color in the first frame of image, the second frame of image, the third frame of image, and the fourth frame of image to obtain several rearranged images; and fusing the several rearranged images to generate the final image.

According to a third aspect, an embodiment of this application provides an electronic device, and the electronic device includes the camera module according to the first aspect.

According to a fourth aspect, an embodiment of this application provides an electronic device, including a processor, a memory, and a program or an instruction stored in the memory and executable on the processor, where the program or the instruction, when executed by the processor, implements the steps of the imaging method according to the second aspect.

According to a fifth aspect, an embodiment of this application provides a readable storage medium, storing a program or an instruction, where the program or the instruction, when executed by a processor, implements the steps of the imaging method according to the second aspect.

According to a sixth aspect, an embodiment of this application provides a chip, including a processor and a communication interface, where the communication interface is coupled to the processor, and the processor is configured to run a program or an instruction, to implement the imaging method according to the second aspect.

According to a seventh aspect, a computer program product is provided, where the computer program product is stored in a non-volatile storage medium and executed by at least one processor to implement the imaging method according to the second aspect.

BRIEF DESCRIPTION OF THE DRAWINGS

FIG. 7 is a schematic flowchart of an imaging method according to an embodiment of this application;

FIG. 8 is a schematic diagram of RGB pixel arrangement of an image sensor according to an embodiment of this application;

DETAILED DESCRIPTION

The following describes the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first," "second," and the like are usually one type, and the number of objects is not limited. For example, the first object may be one or more than one. In addition, in the specification and the claims, "and/or" means at least one of the connected objects, and the character "/" generally indicates an "or" relationship between the associated objects.

A camera module, an imaging method, and an electronic device provided in the embodiments of this application are described below through specific embodiments and application scenarios thereof with reference to the accompanying drawings.

Figure 1:
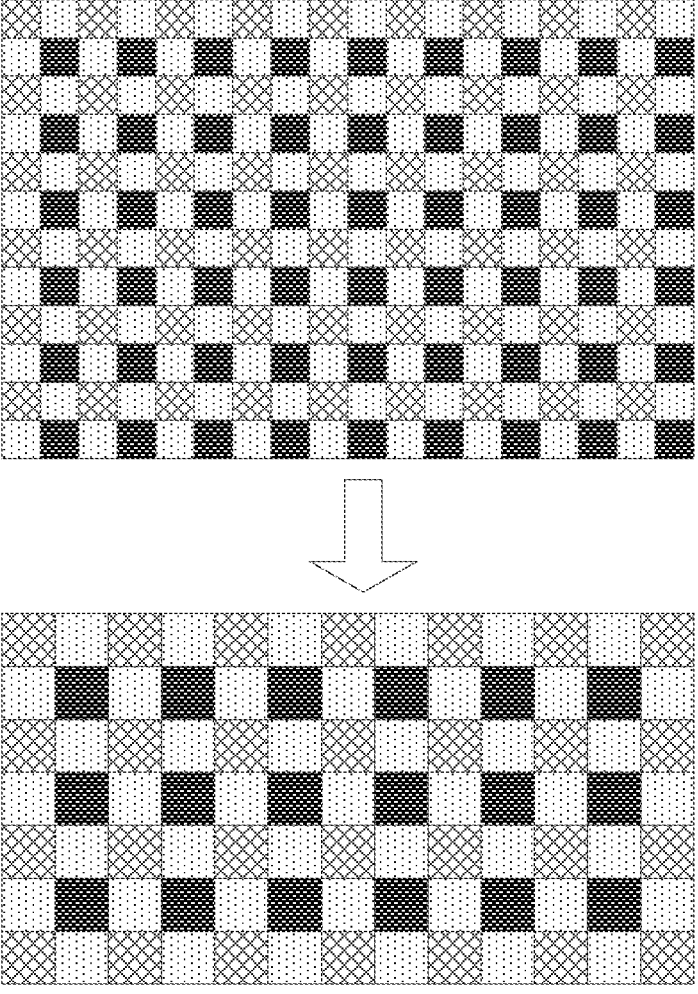
FIG. 1 is a schematic diagram of increasing a pixel unit size under the same physical size in the prior art.

FIG. 1 is a schematic diagram of increasing a pixel unit size under the same physical size in the prior art. As shown in FIG. 1, in the prior art, one solution to improving the photographing effect of a camera is: increasing the pixel unit size without changing the physical size. The increase in the pixel unit size can improve the photosensitivity, but the resolution of the image sensor is correspondingly reduced. To maintain a high resolution, the physical size of the camera needs to be correspondingly increased, which leads to an increase in cost and an increase in a volume occupied by the camera.

Figure 2:
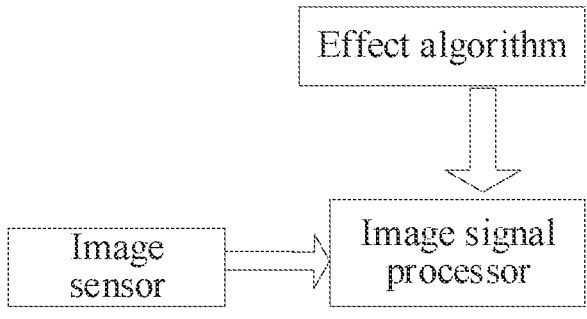
FIG. 2 is a schematic flowchart of a processing algorithm for improving a photographing effect in the prior art.

FIG. 2 is a schematic flowchart of a processing algorithm for improving a photographing effect in the prior art. As shown in FIG. 2, in the prior art, another solution to improving the photographing effect is: after the image sensor obtains continuous multiple frames of images, improving the photographing effect by adding an effect algorithm (for example, a multi-frame fusion algorithm) on a platform side and further processing the images. As a result, power consumption of an image processing system is increased, and adding the algorithm also leads to an increase in the image processing time.

Figure 3:
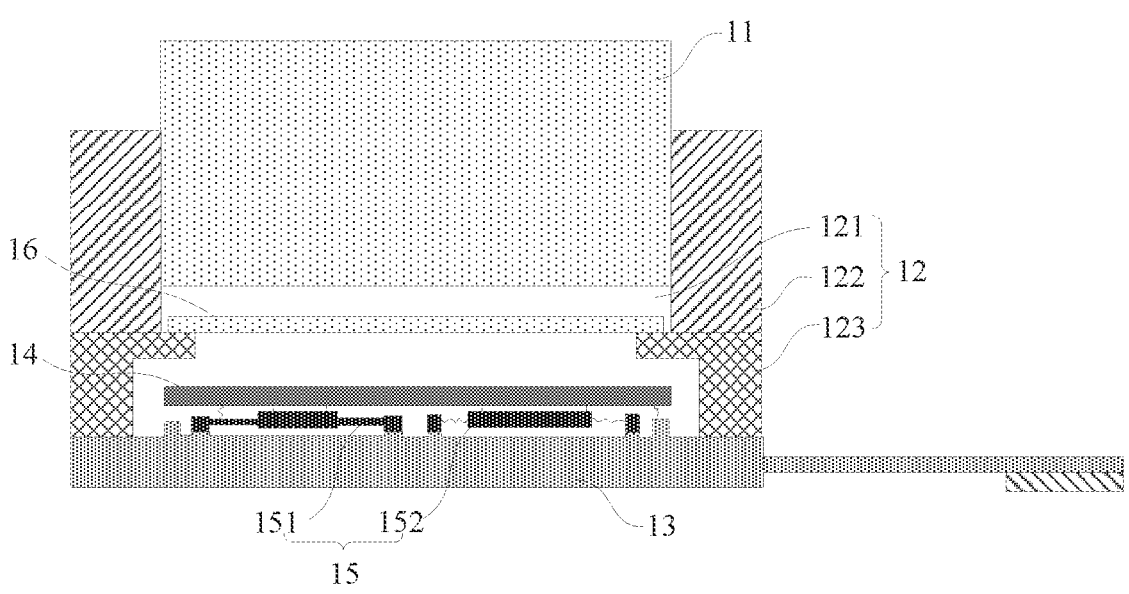
FIG. 3 is a schematic structural diagram of a camera module according to an embodiment of this application.

Therefore, FIG. 3 is a schematic structural diagram of a camera module according to an embodiment of this application. As shown in FIG. 3, an embodiment of this application provides a camera module, and the camera module may include a lens 11, a lens fixing assembly 12, a circuit board 13, an image sensor 14, and a driving assembly 15. The lens fixing assembly 12 is arranged on one side of the circuit board 13, a mounting groove is provided on the lens fixing assembly 12, and the lens 11 is mounted in the mounting groove. The lens 11, the lens fixing assembly 12, and the circuit board 13 are enclosed to form an accommodating cavity, the image sensor 14 is arranged in the accommodating cavity and is arranged opposite to the lens 11, that is, an optical axis of the lens 11 is perpendicular to a photosensitive surface of the image sensor 14, and the image sensor 14 is further electrically connected to the circuit board 13 to convert a received optical signal into an electrical signal and transmit the electrical signal to the circuit board 13. The driving assembly 15 is located between the image sensor 14 and the circuit board 13, and the driving assembly 15 may drive the image sensor 14 to move along a first straight line and a second straight line on a plane perpendicular to the optical axis of the lens 11, where the first straight line and the second straight line are perpendicular to each other. That is, the driving assembly 15 may drive the image sensor 14 to undergo a displacement at a pixel size level on the circuit board 13, so that the image sensor 14 can become photosensitive at different positions during photographing. A final image is obtained according to photosensitive data for multiple times, which can effectively improve the photographing effect without causing other negative impact.

Figure 4:
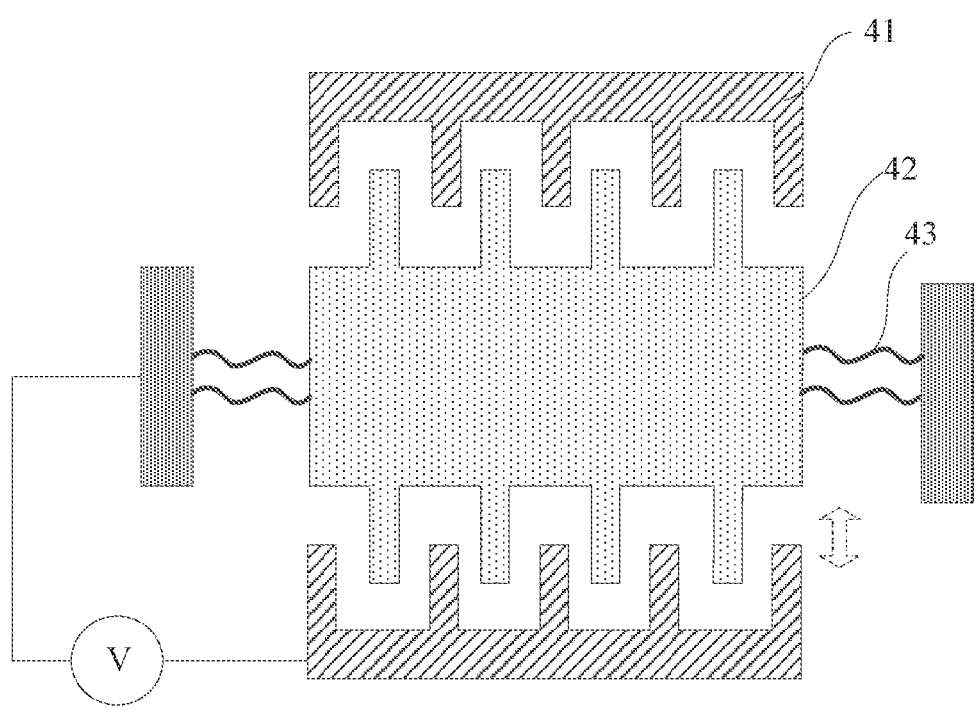
FIG. 4 is a schematic structural diagram of an electrostatic comb-drive actuator according to an embodiment of this application.

FIG. 4 is a schematic structural diagram of an electrostatic comb-drive actuator according to an embodiment of this application. As shown in FIG. 4, the electrostatic comb-drive actuator includes a fixed tooth portion 41, a movable tooth portion 42, and an elastic beam 43. The fixed tooth portion 41 is comb-shaped, the movable tooth portion 42 is provided with teeth on two opposite sides thereof, a plurality of teeth are arranged on the fixed tooth portion 41 and the movable tooth portion 42, and the teeth of the fixed tooth portion 41 and the movable tooth portion 42 are staggered from each other. In a case that a direct current drive voltage is applied between the fixed tooth portion 41 and the movable tooth portion 42 of the electrostatic comb-drive actuator, an electrostatic force is generated between the movable tooth portion 42 and the fixed tooth portion 41, thereby driving the movable tooth portion 42 to move in a direction shown by the arrow in FIG. 4. It should be noted that, the electrostatic comb-drive actuator in the embodiments of this application refers to a Micro Electro Mechanical System (MEMS) electrostatic comb-drive actuator, to meet a high-precision displacement of the image sensor 14.

In the embodiments of this application, the driving assembly 15 includes at least one first electrostatic comb-drive actuator 151 and at least one second electrostatic comb-drive actuator 152, the first electrostatic comb-drive actuator 151 may be configured to drive the image sensor 14 to move along the first straight line on the plane perpendicular to the optical axis of the lens 11, and the second electrostatic comb-drive actuator 152 may be configured to drive the image sensor 14 to move along the second straight line on the plane perpendicular to the optical axis of the lens 11, so that the image sensor 14 can move in different directions.

In the embodiments of this application, the first electrostatic comb-drive actuator 151 includes a first movable tooth portion 1512 and a first fixed tooth portion 1511, the second electrostatic comb-drive actuator 152 includes a second movable tooth portion 1522 and a second fixed tooth portion 1521, the first fixed tooth portion 1511 and the second fixed tooth portion 1521 are connected to the circuit board 13, and the first movable tooth portion 1512 and the second movable tooth portion 1522 are connected to the image sensor 14. In some implementations, the first movable tooth portion 1512 and the second movable tooth portion 1522 may be adhesively fixed to the image sensor 14 through an adhesive. In a case that a drive voltage is applied to the first electrostatic comb-drive actuator 151, the first movable tooth portion 1512 is movable along the first straight line under an action of an electrostatic force, and in a case that the drive voltage is applied to the second electrostatic comb-drive actuator 152, the second movable tooth portion 1522 is movable along the second straight line under the action of the electrostatic force.

Figures 5, 6:
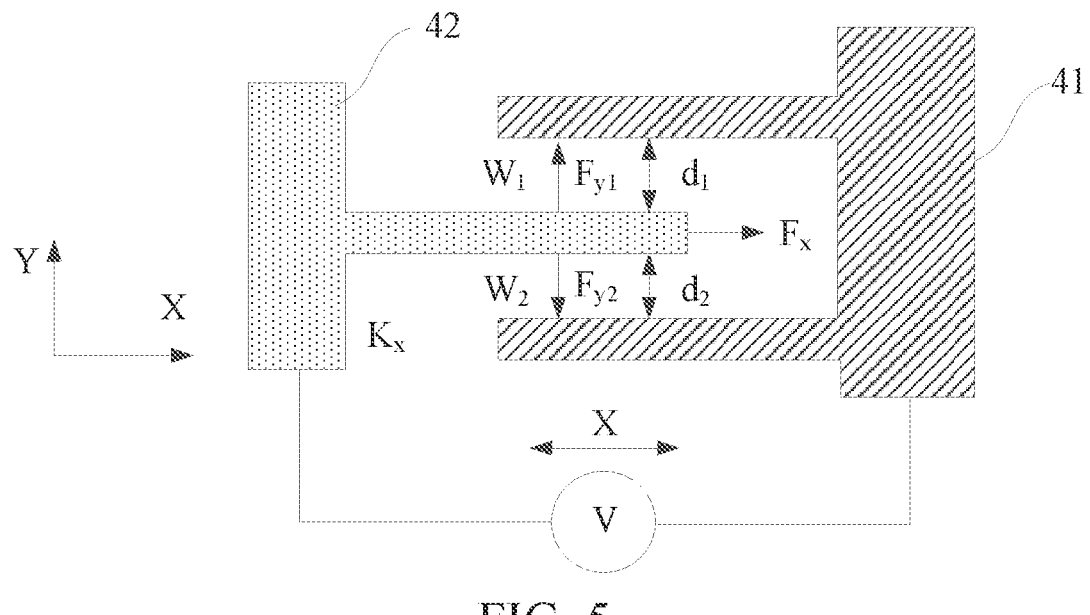
FIG. 5 is a schematic diagram of force analysis of an electrostatic comb-drive actuator according to an embodiment of this application.
FIG. 6 is a schematic diagram of an arranged position of a driving assembly according to an embodiment of this application.

FIG. 5 is a schematic diagram of force analysis of an electrostatic comb-drive actuator according to an embodiment of this application. As shown in FIG. 5, after a direct current drive voltage U is applied to the fixed tooth portion 41 and the movable tooth portion 42, force analysis is performed on a single tooth, and the principle is as follows:

(1) By a capacitor potential energy formula:

$$W = \frac{CU^2}{2},$$

where

C is a capacitance and U is a voltage, electrostatic potential energy between a tooth of the movable tooth portion 42 and a tooth of the fixed tooth portion 41 is:

$$W_1 = \frac{C_1 U^2}{2}, \text{ and}$$

$$W_2 = \frac{C_2 U^2}{2},$$

where $C_1$ and $C_2$ are equivalent capacitances between the tooth of the movable tooth portion 42 and the tooth of the fixed tooth portion 41, and U is a voltage between the tooth of the movable tooth portion 42 and the tooth of the fixed tooth portion 41.

(2) By:

$$E = \frac{U}{d} = \frac{F}{Q},$$

and $$Q = U * C,$$

the electrostatic force on a single capacitor plate is:

$$F = \frac{C * U^2}{2d},$$

where

E is an electric field strength, U is a voltage, d is a distance of a capacitor plate, Q is a charge amount, F is an electrostatic force, and C is a capacitance.

(3) If a change of the electric potential energy is equal to an electrostatic force, the electrostatic force is:

$$F_X = W_1 + W_2 = \frac{C_1 U^2}{2} + \frac{C_2 U^2}{2} = K_x * X,$$

where $K_x$ is an elastic coefficient of the elastic beam, $W_1$ and $W_2$ are the electrostatic potential energy of the upper and lower equivalent capacitances of the tooth of the movable tooth portion and the tooth of the fixed tooth portion, and X is a lateral displacement of the tooth of the movable tooth portion 42;

(4) By a capacitance formula:

$$C = \frac{\varepsilon_0 * h * X}{4 * \pi * k * d},$$

then:

$$C_1 = \frac{\varepsilon_0 * h * X}{4 * \pi * k * d_1}, \text{ and}$$

$$C_2 = \frac{\varepsilon_0 * h * X}{4 * \pi * k * d_2},$$

where $d_1$ and $d_2$ are an upper distance and a lower distance between the tooth of the movable tooth portion and the tooth of the fixed tooth portion. Therefore, when the electrostatic comb-drive actuator has N pairs of electrostatic teeth, the electrostatic force is:

$$F_X = \frac{N * \varepsilon_0 * h}{4 * \pi * k * d} * U^2,$$

where $\varepsilon_0$ is a vacuum electrostatic constant, his a height of the tooth, X is a lateral displacement of the tooth of the movable tooth portion 42, $\pi$ is a circumference ratio constant, and k is an electrostatic force constant.

In actual application, since the teeth of the movable tooth portion 42 move in a transverse direction, in a vertical direction, if $d_1 = d_2$, $F_{y1} = F_{y2}$, and the two directions are opposite and offset each other. Therefore, when the height h and the distance d of the electrostatic teeth are constants, a magnitude of the electrostatic force $F_X$ is only related to the direct current drive voltage U, and according to Hooke's law, it can be obtained that when the electrostatic comb-drive actuator has N pairs of teeth, the movable tooth portion 42 undergoes the lateral displacement after being powered on.

$$X = \frac{N * \varepsilon_0 * h}{4 * \pi * k * d * K_x} * U^2$$

Therefore, the displacement of the movable tooth portion 42 can be controlled by controlling the magnitude of the direct current drive voltage applied to the electrostatic comb-drive actuator, thereby achieving the displacement at a micro level, and the precision can even reach a nanometer level. Since a pixel unit size of the image sensor 14 in the embodiments of this application is micron-level, the electrostatic comb-drive actuator can completely control the image sensor 14 to achieve the displacement at a pixel size level.

FIG. 6 is a schematic diagram of an arranged position of a driving assembly 15 according to an embodiment of this application. As shown in FIG. 6, in some embodiments of this application, two first electrostatic comb-drive actuators 151 and two second electrostatic comb-drive actuators 152 are provided, the two first electrostatic comb-drive actuators 151 and the two second electrostatic comb-drive actuators 152 are arranged in a rectangular grid, orthographic projections of the two first electrostatic comb-drive actuators 151 on the circuit board 13 are centrally symmetrical, and orthographic projections of the two second electrostatic comb-drive actuators 152 on the circuit board 13 are centrally symmetrical. For example, if the image sensor 14 is rectangular (including square), the two first electrostatic comb-drive actuators 151 may be arranged along one diagonal line of the image sensor 14, the two second electrostatic comb-drive actuators 152 are arranged along the other diagonal line of the image sensor 14 to form a field-shaped distribution. Such an arrangement manner can improve the smoothness of the driving assembly 15 in a process of driving the image sensor 14, thereby improving the imaging effect. In some implementations, more first electrostatic comb-drive actuators 151 and second electrostatic comb-drive actuators 152 may be provided, and the arrangement manner thereof may be in a symmetrical relationship (for example, centrally symmetrical).

Referring to FIG. 6, in the embodiments of this application, the driving assembly 15 further includes a driver chip 17. The driver chip 17 is arranged on the circuit board 13, the driver chip 17 is connected to the first electrostatic comb-drive actuator 151 and the second electrostatic comb-drive actuator 152, and the driver chip 17 is configured to drive the first electrostatic comb-drive actuator 151 and the second electrostatic comb-drive actuator 152 to work. That is, the driver chip 17 may control a displacement of the image sensor 14 and a direction of the displacement by controlling a direction and magnitude of the direct current drive voltage applied to the first electrostatic comb-drive actuator 151 and the second electrostatic comb-drive actuator 152.

Referring to FIG. 3, in some other embodiments of this application, the lens fixing assembly 12 includes a base 123 and a driving motor 122. The base 123 is fixed to one side of the circuit board 13. For example, the base 123 may be cylindrical, and the driving motor 122 is arranged on the base 123. A mounting groove is provided on the driving motor 122, and the lens 11 is arranged in the mounting groove and connected to the driving motor 122. The driving motor 122 may be configured to drive the lens 11 to move on the optical axis of the lens 11 to adjust a focal length. In some implementations, the driving motor 122 may be a voice coil motor.

Referring to FIG. 3, in the embodiments of this application, a filter 16 is further arranged between the lens 11 and the image sensor 14. The filter 16 may be fixed on the base 123, and the filter 16 is perpendicular to the optical axis of the lens 11 to filter light passing through the lens 11.

In the embodiments of this application, by controlling the image sensor 14 to undergo a displacement at a pixel size level, the photographing effect can be effectively improved without introducing negative impact, for example, the resolution, dynamic range, and authenticity of color restoration can be improved, and noise can be reduced.

Another embodiment of this application further provides an electronic device. The electronic device includes a camera module according to the foregoing embodiments. Since the camera module in the foregoing embodiments can undergo a displacement at a pixel size level by controlling the image sensor 14, the photographing effect can be effectively improved without introducing negative impact, for example, the resolution, dynamic range, and authenticity of color restoration can be improved, and the noise can be reduced. Therefore, the electronic device in the embodiments of this application also correspondingly has the foregoing beneficial effects. To avoid repetition, details are not described herein again.

FIG. 7 is a schematic flowchart of an imaging method according to an embodiment of this application. As shown in FIG. 7, an embodiment of this application further provides an imaging method. The imaging method is applied to the camera module according to the foregoing embodiments, and the imaging method may include the following steps:

Step 71: Obtain a first frame of image by using the camera module, and drive, through the driving assembly, an image sensor to move by a first preset distance in a first direction along a first straight line on a plane perpendicular to an optical axis of the lens, move by a second preset distance in a second direction along a second straight line on the plane perpendicular to the optical axis of the lens, and move by a third preset distance in a third direction along the first straight line on the plane perpendicular to the optical axis of the lens in sequence, to obtain a second frame of image, a third frame of image, and a fourth frame of image correspondingly, where the third direction is a direction opposite to the first direction.

Figure 9:
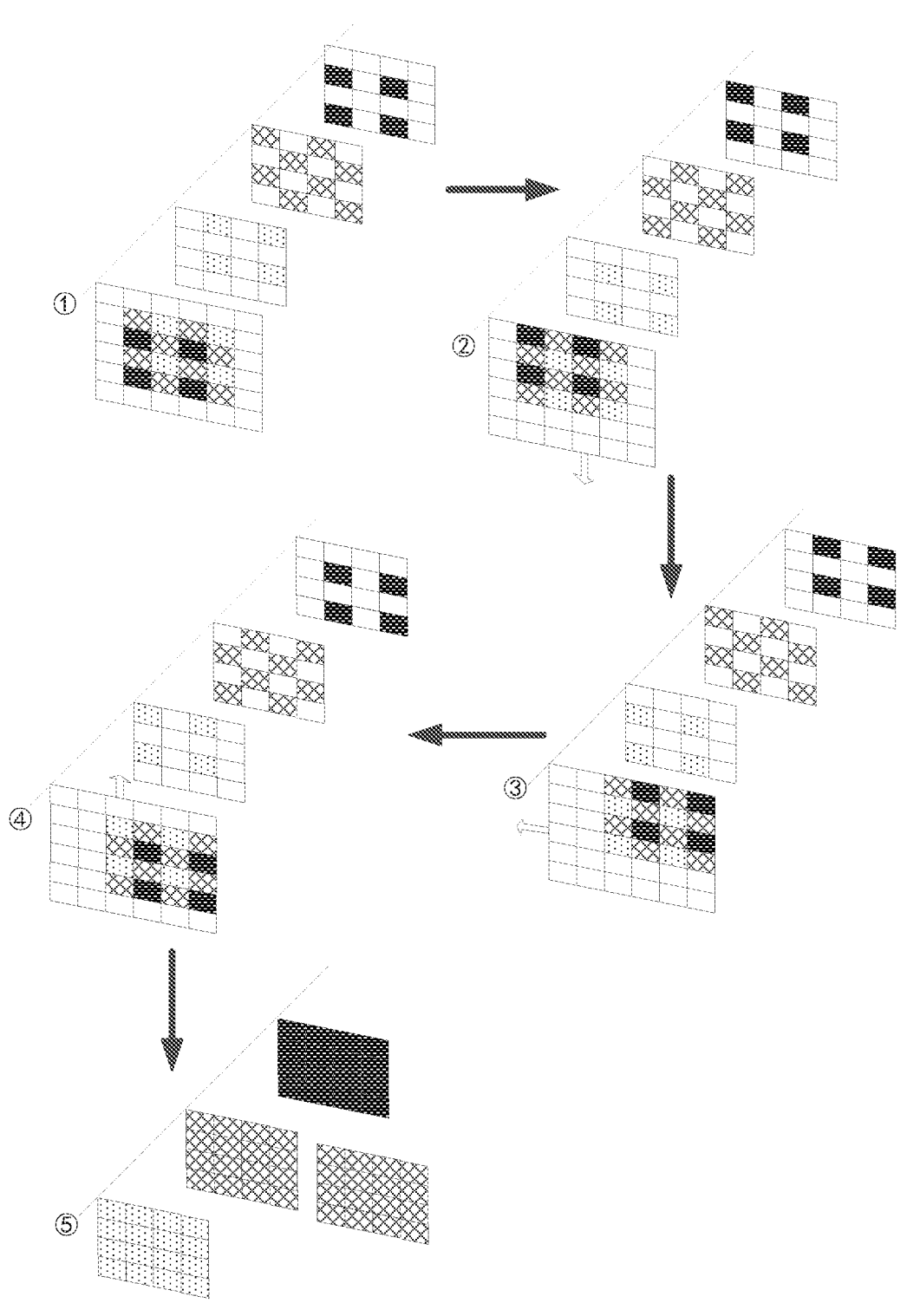
FIG. 9 is a schematic diagram of image photographing by moving an image sensor according to an embodiment of this application.

Referring to FIG. 8 and FIG. 9, FIG. 8 is a schematic diagram of RGB pixel arrangement of an image sensor according to an embodiment of this application, and FIG. 9 is a schematic diagram of image photographing by moving an image sensor according to an embodiment of this application. As shown in FIG. 8 and FIG. 9, an example in which conventional RGB pixels are arranged according to a Bayer array arrangement manner. In this step, first, a first frame of image is obtained by using a camera module; then, an image sensor is driven by a driving assembly of the camera module to move by a first preset distance in a first direction along a first straight line on a plane perpendicular to an optical axis of a lens to obtain a second frame of image, the image sensor is driven by the driving assembly to move by a second preset distance in a second direction along a second straight line on the plane perpendicular to the optical axis of the lens to obtain a third frame of image, and the image sensor is continuously driven by the driving assembly to move by a third preset distance in a third direction along a first straight line on the plane perpendicular to the optical axis of the lens to obtain a fourth frame of image, where the third direction is a direction opposite to the first direction.

In the embodiments of this application, the first frame of image includes several square pixel units, and the first preset distance, the second preset distance, and the third preset distance are all positive integer multiples of a side length of a single pixel unit.

Step 72: Generate a final image according to the first frame of image, the second frame of image, the third frame of image, and the fourth frame of image.

After four frames of images are obtained by driving the image sensor to undergo a displacement at a pixel size level, the final image may be generated according to the four frames of images. In some implementations, the step of generating a final image according to the first frame of image, the second frame of image, the third frame of image, and the fourth frame of image includes:

obtaining single-channel data of each color in the first frame of image, the second frame of image, the third frame of image, and the fourth frame of image;

rearranging single-channel data of the same color in the first frame of image, the second frame of image, the third frame of image, and the fourth frame of image to obtain several rearranged images; and fusing the several rearranged images to generate the final image.

For example, in the foregoing steps, R-channel data, G-channel data, and B-channel data in the first frame of image, the second frame of image, the third frame of image, and the fourth frame of image are first obtained, and then the R-channel data, the G-channel data, and the B-channel data in the first frame of image, the second frame of image, the third frame of image, and the fourth frame of image are rearranged to obtain several rearranged images. It should be noted that due to the Bayer array arrangement manner, two frames of rearranged images are obtained after the G-channel data is rearranged. Finally, all the rearranged images are fused to obtain the final image.

Figure 10:
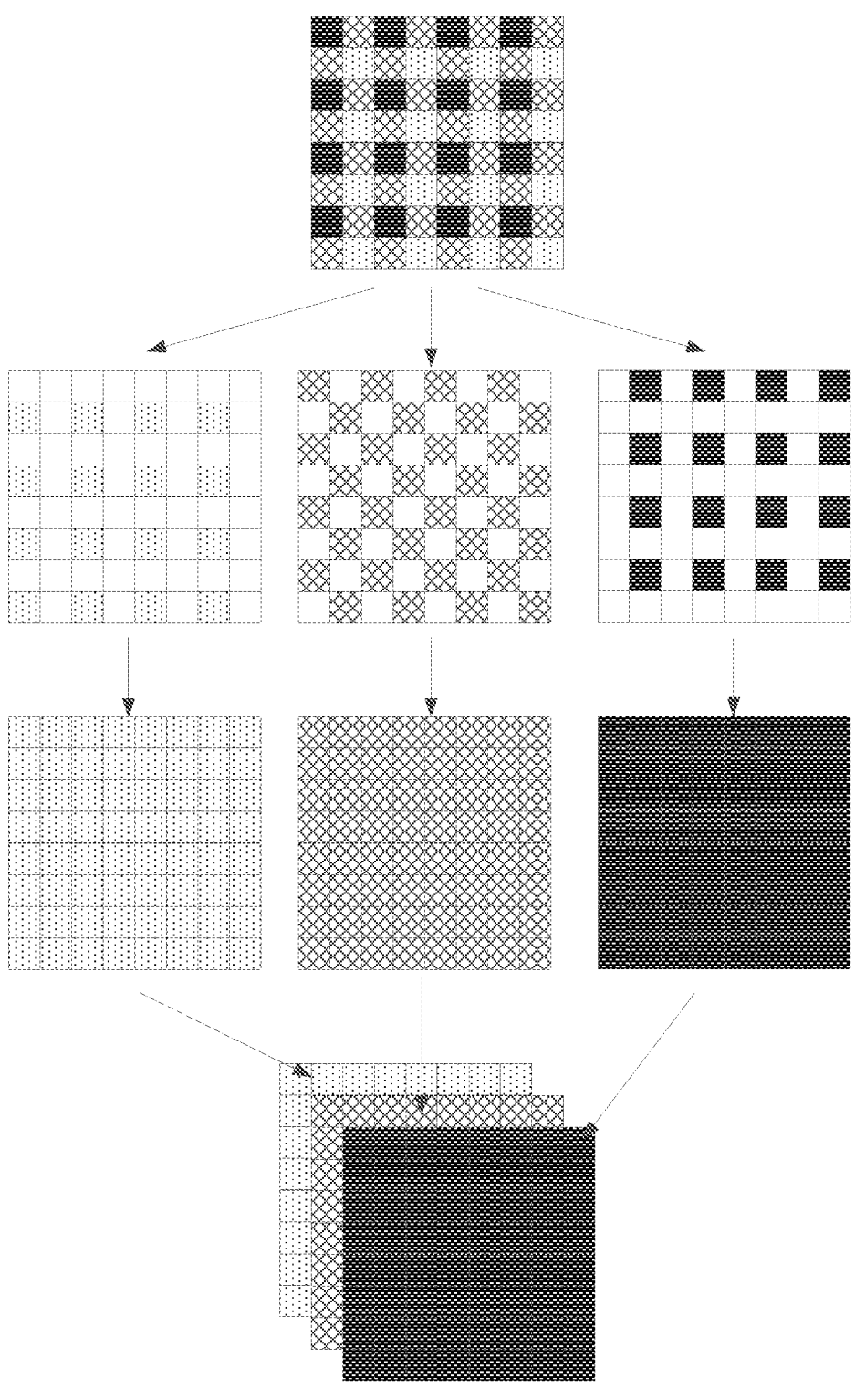
FIG. 10 is a schematic diagram of a processing procedure of a photographic image in the prior art.

FIG. 10 is a schematic diagram of a processing procedure of a photographic image in the prior art. As shown in FIG. 10, when performing image restoration in a regular photography, single-frame R, G and B images are obtained through difference according to a De-mosaic algorithm, and then the final image is obtained by fusion. The De-mosaic algorithm is a digital interpolation method to fill signal information that is not obtained in a single channel (for example, the G-channel is next to the R-channel, and red R-channel component information is lacking in the position of the G-channel in a case that the image sensor is not moved), which belongs to digital amplification, and therefore the final imaging effect is poor. In the embodiments of the application, single-channel data of each position is obtained by directly moving the image sensor, so that the resolution and dynamic range can be improved, the noise can be reduced, and the authenticity of color restoration can be improved, thereby improving the photographing effect.

It should be noted that, in the imaging method provided in the embodiments of this application, an execution body may be an imaging apparatus, or a control module in the imaging apparatus that is configured to perform the imaging method. In the embodiments of this application, an example in which an imaging module performs the imaging method is used to describe the imaging apparatus provided in the embodiments of this application.

The imaging apparatus provided in the embodiments of this application may include:

an obtaining module, configured to obtain a first frame of image by using the camera module, and drive, through the driving assembly, an image sensor to move by a first preset distance in a first direction along a first straight line on a plane perpendicular to an optical axis of the lens, move by a second preset distance in a second direction along a second straight line on the plane perpendicular to the optical axis of the lens, and move by a third preset distance in a third direction along the first straight line on the plane perpendicular to the optical axis of the lens in sequence, to obtain a second frame of image, a third frame of image, and a fourth frame of image correspondingly, where the third direction is a direction opposite to the first direction; and a generation module, configured to generate a final image according to the first frame of image, the second frame of image, the third frame of image, and the fourth frame of image.

In the embodiments of this application, by controlling the image sensor to undergo a displacement at a pixel size level, the photographing effect can be effectively improved without introducing negative impact, for example, the resolution, dynamic range, and authenticity of color restoration can be improved, and the noise can be reduced.

The imaging apparatus in the embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an Ultra-Mobile Personal Computer (UMPC), a netbook, or a Personal Digital Assistant (PDA), and the non-mobile electronic device may be a personal computer, a television, a teller machine, or an automated machine, which are not specifically limited in the embodiments of this application.

The imaging apparatus in the embodiments of this application may be an apparatus having an operating system. The operating system may be Android operating system, an iOS operating system, or another possible operating system, which is not specifically limited in the embodiments of this application.

The imaging apparatus provided in the embodiments of this application can implement all processes implemented by the method embodiments of FIG. 7 to FIG. 9. To avoid repetition, details are not described herein again.

Figure 11:
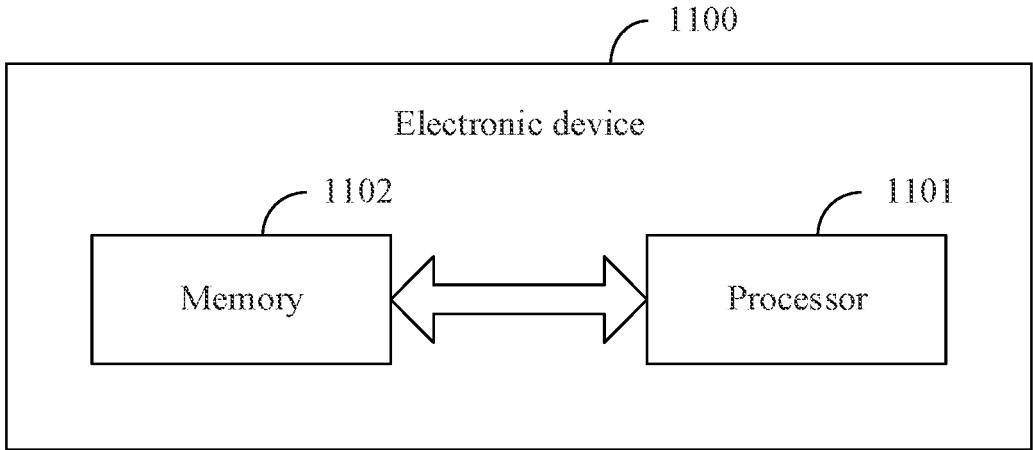
FIG. 11 is a schematic structural diagram of an electronic device according to an embodiment of this application.

In some implementations, as shown in FIG. 11, an embodiment of this application further provides an electronic device 1100, including a processor 1101, a memory 1102, and a program or an instruction stored on the memory 1102 and executable on the processor 1101. The program or the instruction, when executed by the processor 1101, implements all processes of the foregoing imaging method embodiments, and can achieve the same technical effects. To avoid repetition, details are not described herein again.

It should be noted that, the electronic device in the embodiments of this application includes the above mobile electronic device and non-mobile electronic device.

Figure 12:
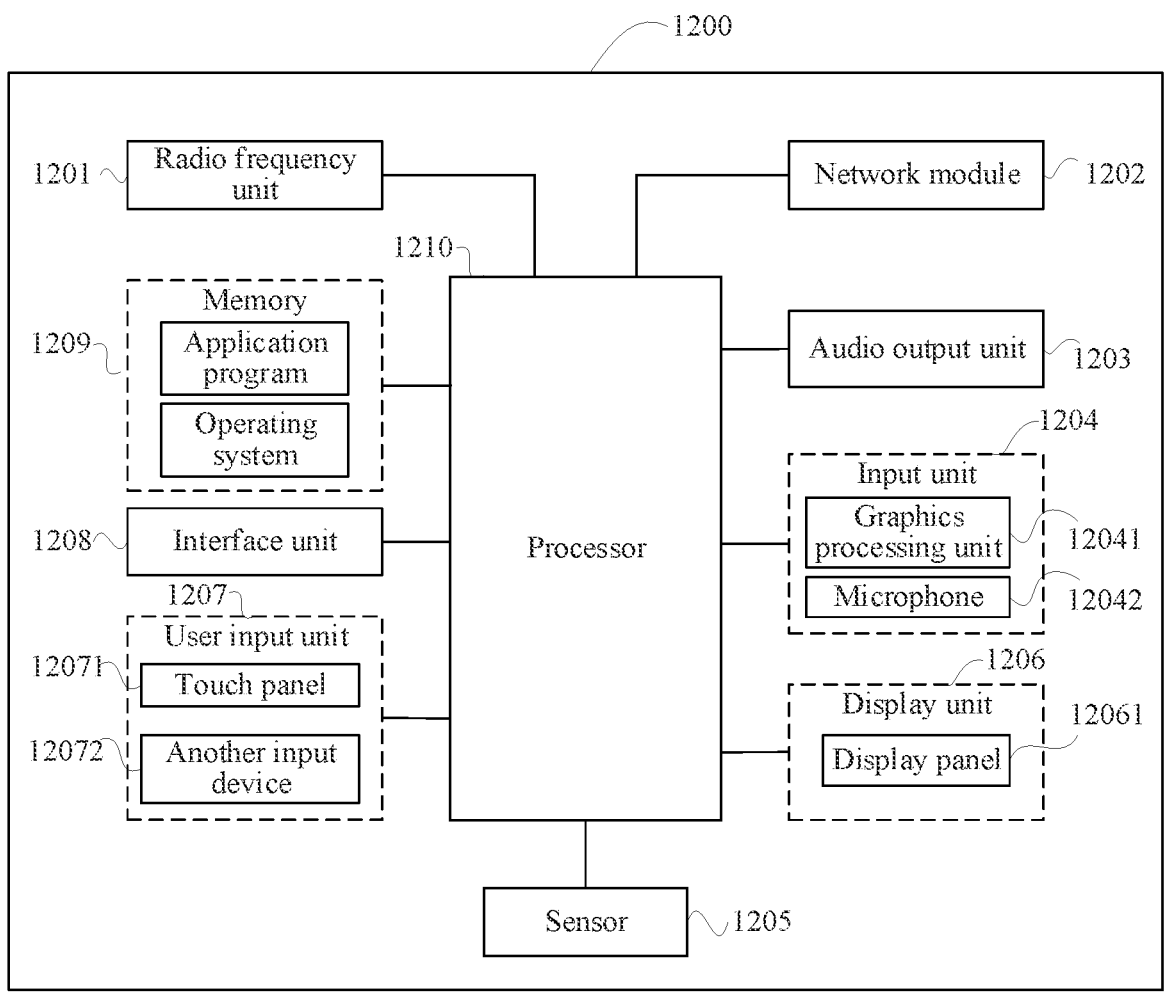
FIG. 12 is a schematic diagram of a hardware structure of an electronic device for implementing the embodiments of this application.

FIG. 12 is a schematic diagram of a hardware structure of an electronic device for implementing the embodiments of this application.

The electronic device 1200 includes, but is not limited to, components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

A person skilled in the art may understand that the electronic device 1200 further includes a power supply (such as a battery) for supplying power to the components. The power supply may logically connect to the processor 1210 by using a power supply management system, thereby implementing functions, such as charging, discharging, and power consumption management, by using the power supply management system. The structure of the electronic device shown in FIG. 12 constitutes no limitation on the electronic device, and the electronic device may include more or fewer components than those shown in the figure, or some components may be combined, or a different component deployment may be used. Details are not described herein again.

The sensor 1205 is configured to obtain a first frame of image, and drive, through the driving assembly, an image sensor to move by a first preset distance in a first direction along a first straight line on a plane perpendicular to an optical axis of the lens to obtain a second frame of image, move by a second preset distance in a second direction along a second straight line on the plane perpendicular to the optical axis of the lens to obtain a third frame of image, and move by a third preset distance in a third direction along the first straight line on the plane perpendicular to the optical axis of the lens to obtain a fourth frame of image in sequence, where the third direction is a direction opposite to the first direction; and the processor 1210 is configured to generate a final image according to the first frame of image, the second frame of image, the third frame of image, and the fourth frame of image.

In the embodiments of this application, by controlling the image sensor to undergo a displacement at a pixel size level, the photographing effect can be effectively improved without introducing negative impact, for example, the resolution, dynamic range, and authenticity of color restoration can be improved, and the noise can be reduced.

In some implementations, the processor 1210 is further configured to obtain single-channel data of each color in the first frame of image, the second frame of image, the third frame of image, and the fourth frame of image;

rearrange single-channel data of the same color in the first frame of image, the second frame of image, the third frame of image, and the fourth frame of image to obtain several rearranged images; and fuse the several rearranged images to generate the final image.

It should be understood that, in this embodiment of this application, the input unit 1204 may include a Graphics Processing Unit (GPU) 12041 and a microphone 12042. The graphics processing unit 12041 performs processing on image data of a static picture or a video that is obtained by an image acquisition apparatus (for example, a camera) in a video acquisition mode or an image acquisition mode. The display unit 1206 may include a display panel 12061, for example, the display panel 12061 may be configured in a form such as a liquid crystal display or an organic light-emitting diode. The user input unit 1207 includes a touch panel 12071 and another input device 12072. The touch panel 12071 is also referred to as a touch screen. The touch panel 12071 may include two parts: a touch detection apparatus and a touch controller. The another input device 12072 may include, but is not limited to, a physical keyboard, a functional key (such as a volume control key or a switch key), a track ball, a mouse, and a joystick, and details are not described herein again. The memory 1209 may be configured to store a software program and various data, and includes, but is not limited to an application program and an operating system. The processor 1210 may integrate an application processor and a modem processor. The application processor mainly processes an operating system, a user interface, an application program, and the like. The modem processor mainly processes wireless communication. It may be understood that the modem processor may not be integrated into the processor 1210.

An embodiment of this application further provides a readable storage medium, storing a program or instruction. The program or instruction, when executed by a processor, implements all processes of the foregoing imaging method embodiments, and can achieve the same technical effects. To avoid repetition, details are not described herein again.

The processor is a processor in the electronic device in the foregoing embodiments. The readable storage medium includes a computer-readable storage medium, for example, a computer Read-Only Memory (ROM), a Random Access Memory (RAM), a magnetic disk, or an optical disc.

An embodiment of this application further provides a chip, including: a processor and a communication interface, where the communication interface is coupled to the processor, and the processor is configured to run a program or an instruction, to implement all processes of the foregoing imaging method embodiments, and can achieve the same technical effects. To avoid repetition, details are not described herein again.

It should be understood that, the chip described in the embodiments of this application may also be referred to as a system-level chip, a system chip, a chip system, a system on chip, or the like.

An embodiment of this application further provides a computer program product, where the computer program product is stored in a non-volatile storage medium and executed by at least one processor to implement all processes of the foregoing imaging method embodiments, and can achieve the same technical effects. To avoid repetition, details are not described herein again.

It should be noted that the terms "include," "comprise," or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that, the scope of the method and apparatus in the embodiments of this application is not limited to performing functions in the order shown or discussed, and it may further include performing the functions in a substantially simultaneous manner or in reverse order according to the functions involved. For example, the described method may be performed in a different order than described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware. Based on such an understanding, the technical solutions in this application essentially or the part contributing to the reflected technologies may be implemented in the form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific embodiments, which are merely illustrative rather than limited. Under the inspiration of this application, a person of ordinary skill in the art may make various variations without departing from the scope of this application and the protection of the claims, and such variations shall fall within the protection of this application.

What is claimed is:

1. A camera module, comprising:
a lens;
a lens fixing assembly;
a circuit board;
an image sensor; and
a driving assembly, wherein:
the lens fixing assembly is arranged at one side of the circuit board, the lens fixing assembly is provided with a mounting groove, and the lens is mounted in the mounting groove;
the lens, the lens fixing assembly, and the circuit board enclose an accommodating cavity, the image sensor is arranged in the accommodating cavity and is arranged opposite to the lens, and the image sensor is electrically connected to the circuit board;
the driving assembly is located between the image sensor and the circuit board, and the driving assembly is configured to drive the image sensor to move along a first straight line and a second straight line on a plane perpendicular to an optical axis of the lens, wherein the first straight line and the second straight line are perpendicular to each other; and
the driving assembly comprises two first electrostatic comb-drive actuators and two second electrostatic comb-drive actuators, orthographic projections of the two first electrostatic comb-drive actuators on the circuit board are centrally symmetrical, and orthographic projections of the two second electrostatic comb-drive actuators on the circuit board are centrally symmetrical.

2. The camera module according to claim 1, wherein the first electrostatic comb-drive actuator is configured to drive the image sensor to move along the first straight line on the plane perpendicular to the optical axis of the lens, and the second electrostatic comb-drive actuator is configured to drive the image sensor to move along the second straight line on the plane perpendicular to the optical axis of the lens.

3. The camera module according to claim 2, wherein the first electrostatic comb-drive actuator comprises a first movable tooth portion and a first fixed tooth portion, the second electrostatic comb-drive actuator comprises a second movable tooth portion and a second fixed tooth portion, the first fixed tooth portion and the second fixed tooth portion are connected to the circuit board, the first movable tooth portion and the second movable tooth portion are connected to the image sensor, wherein when a drive voltage is applied to the first electrostatic comb-drive actuator, the first movable tooth portion is movable along the first straight line, and when the drive voltage is applied to the second electrostatic comb-drive actuator, the second movable tooth portion is movable along the second straight line.

4. The camera module according to claim 2, wherein the two first electrostatic comb-drive actuators and the two second electrostatic comb-drive actuators are arranged in a rectangular grid.

5. The camera module according to claim 2, wherein the driving assembly further comprises a driver chip, the driver chip is arranged on the circuit board, the driver chip is connected to the first electrostatic comb-drive actuator and the second electrostatic comb-drive actuator, and the driver chip is configured to drive the first electrostatic comb-drive actuator and the second electrostatic comb-drive actuator to work.

6. The camera module according to claim 1, wherein the lens fixing assembly comprises a base and a driving motor, the base is fixed on one side of the circuit board, the driving motor is arranged on the base, the lens is connected to the driving motor, and the driving motor is configured to drive the lens to move on the optical axis of the lens.

7. The camera module according to claim 1, further comprises a filter arranged between the lens and the image sensor, and the filter is perpendicular to the optical axis of the lens.

8. An electronic device, comprising:
a camera module, wherein the camera module comprises:
    a lens;
    a lens fixing assembly;
    a circuit board;
    an image sensor; and
    a driving assembly, wherein:
      the lens fixing assembly is arranged at one side of the circuit board, the lens fixing assembly is provided with a mounting groove, and the lens is mounted in the mounting groove;
      the lens, the lens fixing assembly, and the circuit board enclose an accommodating cavity, the image sensor is arranged in the accommodating cavity and is arranged opposite to the lens, and the image sensor is electrically connected to the circuit board;
      the driving assembly is located between the image sensor and the circuit board, and the driving assembly is configured to drive the image sensor to move along a first straight line and a second straight line on a plane perpendicular to an optical axis of the lens, wherein the first straight line and the second straight line are perpendicular to each other; and
      the driving assembly comprises two first electrostatic comb-drive actuators and two second electrostatic comb-drive actuators arranged in a rectangular grid, orthographic projections of the two first electrostatic comb-drive actuators on the circuit board are centrally symmetrical, and orthographic projections of the two second electrostatic comb-drive actuators on the circuit board are centrally symmetrical.

9. The electronic device according to claim 8, wherein the first electrostatic comb-drive actuator is configured to drive the image sensor to move along the first straight line on the plane perpendicular to the optical axis of the lens, and the second electrostatic comb-drive actuator is configured to drive the image sensor to move along the second straight line on the plane perpendicular to the optical axis of the lens.

10. The electronic device according to claim 9,
    wherein the first electrostatic comb-drive actuator comprises a first movable tooth portion and a first fixed tooth portion, the second electrostatic comb-drive actuator comprises a second movable tooth portion and a second fixed tooth portion, the first fixed tooth portion and the second fixed tooth portion are connected to the circuit board, the first movable tooth portion and the second movable tooth portion are connected to the image sensor,
    wherein when a drive voltage is applied to the first electrostatic comb-drive actuator, the first movable tooth portion is movable along the first straight line, and when the drive voltage is applied to the second electrostatic comb-drive actuator, the second movable tooth portion is movable along the second straight line.

11. The electronic device according to claim 9, wherein the two first electrostatic comb-drive actuators and the two second electrostatic comb-drive actuators are arranged in a rectangular grid.

12. The electronic device according to claim 9, wherein the driving assembly further comprises a driver chip, the driver chip is arranged on the circuit board, the driver chip is connected to the first electrostatic comb-drive actuator and the second electrostatic comb-drive actuator, and the driver chip is configured to drive the first electrostatic comb-drive actuator and the second electrostatic comb-drive actuator to work.

13. The electronic device according to claim 8, wherein the lens fixing assembly comprises a base and a driving motor, the base is fixed on one side of the circuit board, the driving motor is arranged on the base, the lens is connected to the driving motor, and the driving motor is configured to drive the lens to move on the optical axis of the lens.

14. The electronic device according to claim 8, wherein the camera module further comprises a filter arranged between the lens and the image sensor, and the filter is perpendicular to the optical axis of the lens.

* * * * *